(12) United States Patent
Kulcke et al.

(10) Patent No.: US 7,758,026 B2
(45) Date of Patent: Jul. 20, 2010

(54) APPARATUS FOR THE HUMIDIFICATION OF THE AIR IN A CABIN OF A PASSENGER OR CARGO AIRCRAFT

(75) Inventors: Walter Kulcke, Jork (DE); Martin Dechow, Neu Wulmstorf (DE)

(73) Assignee: Airbus Deutschland GmbH, Hamburg (DE)

( * ) Notice: Subject to any disclaimer, the term of this patent is extended or adjusted under 35 U.S.C. 154(b) by 944 days.

(21) Appl. No.: 11/568,104

(22) PCT Filed: May 11, 2005

(86) PCT No.: PCT/EP2005/005100
§ 371 (c)(1),
(2), (4) Date: Oct. 19, 2006

(87) PCT Pub. No.: WO2005/110844
PCT Pub. Date: Nov. 24, 2005

(65) Prior Publication Data
US 2007/0245751 A1    Oct. 25, 2007

(30) Foreign Application Priority Data
May 18, 2004   (DE) .................. 10 2004 024 615

(51) Int. Cl.
*B01F 3/04* (2006.01)
(52) U.S. Cl. .................. 261/141; 261/28; 261/78.2; 261/115
(58) Field of Classification Search ............. 261/28, 261/72.1, 78.2, 115, 116, 130, 141, 142, 261/DIG. 4
See application file for complete search history.

(56) References Cited

U.S. PATENT DOCUMENTS

| | | | | |
|---|---|---|---|---|
| 3,570,472 A | * | 3/1971 | Santangelo | .............. 126/113 |
| 3,923,482 A | * | 12/1975 | Knab et al. | .............. 55/412 |
| 3,990,427 A | | 11/1976 | Clinebell et al. | |

(Continued)

FOREIGN PATENT DOCUMENTS

CN          2572271          9/2003

(Continued)

OTHER PUBLICATIONS

Forms PCT/ISA/210, 220, 237 International Search Report for PCT/EP2005/005100, mailed on Sep. 14, 2005.
English Translation of Decision On Granting A Patent for Invention, Russian Patent Office, Jun. 16, 2008.
English Translation of The First Office Action, Chinese Patent Office, Feb. 12, 2010.

*Primary Examiner*—Scott Bushey
(74) *Attorney, Agent, or Firm*—Wood, Herron & Evans, L.L.P.

(57) ABSTRACT

A humidification apparatus which makes possible individual humidification of the air in a cabin of a passenger or cargo aircraft makes available a conditioning fluid to be ejected into the cabin from an outlet nozzle (10). The conditioning fluid contains as a component water which is sprayed at a spraying point in very close spatial association with the outlet nozzle (10). To avoid undesired local cooling of the cabin air caused by vaporization of the sprayed water, the conditioning fluid contains an air flow conducted to the outlet nozzle, into which the water is sprayed. The air flow is supplied to the spraying point at a temperature which is higher by a defined amount than a desired effective temperature of the air flow after emerging from the outlet nozzle. In another embodiment the conditioning fluid contains water as its only component, the water being sprayed at a temperature above the cabin temperature.

12 Claims, 4 Drawing Sheets

U.S. PATENT DOCUMENTS

| | | | | |
|---|---|---|---|---|
| 4,390,479 | A * | 6/1983 | Gates | 261/27 |
| 4,401,013 | A * | 8/1983 | Ohashi et al. | 454/140 |
| 4,437,318 | A * | 3/1984 | Werjefelt | 62/93 |
| 4,500,479 | A * | 2/1985 | Fukami et al. | 261/98 |
| 4,880,447 | A * | 11/1989 | Bloch | 95/225 |
| 5,037,585 | A * | 8/1991 | Alix et al. | 261/142 |
| 5,699,983 | A | 12/1997 | Ellsworth | |
| 5,836,515 | A | 11/1998 | Fonzes et al. | |
| 5,944,284 | A | 8/1999 | Bardel | |
| 6,129,285 | A * | 10/2000 | Schafka | 236/44 C |
| 6,375,849 | B1 | 4/2002 | Crabtree et al. | |
| 6,460,353 | B2 * | 10/2002 | Udobot et al. | 62/86 |
| 6,491,254 | B1 * | 12/2002 | Walkinshaw et al. | 244/118.5 |
| 6,539,730 | B1 * | 4/2003 | Hesse et al. | 62/91 |
| 2003/0051886 | A1 * | 3/2003 | Adiga et al. | 169/43 |
| 2003/0141412 | A1 | 7/2003 | Fieldson et al. | |

FOREIGN PATENT DOCUMENTS

| | | |
|---|---|---|
| DE | 2330976 | 6/1974 |
| DE | 2832416 | 2/1980 |
| EP | 0345190 | 12/1989 |
| EP | 0779207 A1 | 6/1997 |
| GB | 533791 | 2/1941 |
| JP | 06115347 | 4/1994 |
| SU | 866352 A | 9/1981 |
| WO | 9412833 | 6/1994 |

* cited by examiner

APPARATUS FOR THE HUMIDIFICATION OF THE AIR IN A CABIN OF A PASSENGER OR CARGO AIRCRAFT

Technical Field

The invention relates to the humidification of the cabin air of a passenger or cargo aircraft.

Background

In pressure-controlled cabins of commercial or transport aircraft the air humidity during flight can fall to very low values of relative air humidity of a few percent, for example, 3 to 5 percent. Such low air humidity is regularly experienced as unpleasant by the persons on board the aircraft because it can cause drying of the nasal mucous membranes and itching eyes.

Through humidification of the cabin air, so that a relative air humidity of, for example, 30% to 50% is established, a more agreeable atmospheric environment can be produced, and comfort on board therefore increased. Many concepts for air humidification in aircraft are known. In centralised systems water is vaporised by contact with hot air tapped from the engines, by electric currents conducted through it, or by other means, and the resulting water vapour is either mixed with a primary air flow made available by the air-conditioning system of the aircraft or with an additional air flow which has bypassed the air-conditioning system. The primary or additional air flow centrally humidified in this way is then distributed to a multiplicity of outlet nozzles through which the humidified air is blown into the cabin.

With such centralised systems the humidified air regularly travels long distances in the ventilation system of the aircraft. The probability that condensate and particles contained in the water will be deposited along the ventilation system and on the structure and insulation of the aircraft is correspondingly high.

A decentralised system is known from EP 0 779 207 A1. In that system the cabin air is humidified by direct spraying of water into the cabin. The water is sprayed through spray nozzles incorporated in the rear faces of the passenger seats or in the cabin trim panels. The spray nozzles are so oriented that the water is sprayed in the direction of the passengers' faces. The water emerges under pressure from a container. Such a separate pressurised water container is allocated to each spray nozzle.

Although the system according to EP 0 779 207 A1 is especially effective in increasing air humidity where it is especially desired, i.e. directly in the region of the mouth, nose and eyes, it has been found that it can be detrimental to thermal comfort. In particular, it has been found that passengers often feel too cold in the face area. This cannot be straightforwardly counteracted by raising the temperature of the conditioned inblown air because the passengers then feel possibly too warm in the rest of their bodies.

It is therefore the object of the invention to ensure agreeable air humidity in the cabin of an aircraft at the same time as high thermal comfort for the persons on board.

SUMMARY

In achieving this effect, the invention starts from an apparatus for humidifying the air in the cabin of a passenger or cargo aircraft which makes available a conditioning fluid to be ejected into the cabin from an outlet nozzle, which conditioning fluid contains water sprayed at a spraying point located in close, in particular very close spatial association with the outlet nozzle. According to one aspect, it is provided according to the invention that the conditioning fluid includes an air flow conducted to the outlet nozzle, into which the water is sprayed, and that the air flow is fed to the spraying point of the water at a temperature which is higher by a defined amount than a desired effective temperature of the air flow after ejection from the outlet nozzle.

According to the invention an additional quantity of heat energy is added to the carrier air flow in the form of a temperature above the desired effective temperature. This additional quantity of heat energy can be utilised by the water for vaporisation, so that the vaporisation energy does not need to be supplied by the cabin air and the vaporisation of the water does not cause local cooling in the region in front of a passenger's face. It has been found that if the vaporisation of the water takes place partially or completely outside the outlet nozzle, i.e. inside the cabin, the vaporisation energy withdrawn from the cabin air can manifest itself in a clearly perceptible local cooling of the air in the face area. This was found to be the cause of the losses of thermal comfort in the solution according to EP 0 779 207 A1.

Effective temperature is understood here to mean the temperature of the ejected air flow after vaporisation of the water, i.e. when no further energy is extracted from the air flow by vaporisation of the water and said air flow is therefore not further cooled by vaporisation.

If the water is completely vaporised before the air flow emerges from the outlet nozzle, the effective temperature can be equated to the ejection temperature of the air flow. However, it is not necessary in the context of the invention that the vaporisation of the water takes place completely upstream of the outlet nozzle. It can take place at least partially after the conditioning fluid has exited the outlet nozzle. In this case heat can still be withdrawn from the air flow after it has exited the outlet nozzle, so that its final temperature after complete vaporisation of the water can be lower than the temperature it has immediately upon exiting the outlet nozzle.

For example, the air flow may be supplied to the spraying point of the water, for example, at a temperature of from 5 to 40 degrees Celsius above the desired effective temperature. The degree to which the temperature of the air flow exceeds the desired effective temperature will depend substantially on the desired relative air humidity. For example, if a relative air humidity of 25% is desired the air flow should be supplied to the water spraying point at an excess temperature of approximately 13.5 degrees Celsius. If, however, a relative air humidity of 50% is desired, this temperature excess should be approximately 28 to 29 degrees Celsius. To estimate the required excess temperature of the air flow, approximately 2500 to 2600 kJ per kilogram of water can be assumed as the energy needed for vaporisation.

The vaporisation apparatus may include, in particular, controllable air flow heating means for heating the air flow to a temperature above the desired effective temperature. The air flow may be supplied to the water spraying point at a temperature above the cabin temperature, in particular in such a way that cooling of the cabin air does not occur. If it is desired to lower the cabin temperature locally or globally, the air flow may also be supplied to the water spraying point at a temperature below the cabin temperature.

The additional quantity of heat energy for vaporising the water that has been mentioned may be contributed by the water itself. In particular, the conditioning fluid may contain water as its only component. According to a further aspect of the invention, the water in this case is sprayed at a temperature above the cabin temperature. For specified heating of the water to a temperature above the cabin temperature, the humidification apparatus may include, in particular, controllable water heating means.

To avoid undesired depositions in the cabin by mineral substances contained in the water and also to avert possible dangers of infection by germs contained in the water, the humidification apparatus may include means for biological and/or chemical and/or physical treatment of the water to be sprayed.

An especially comfortable individual adaptation is permitted by a configuration in which the outlet nozzle is arranged on a free end of a flexible section of hose projecting into the cabin interior. By bending the section of hose a passenger can then align the outlet nozzle according to his own wishes.

BRIEF DESCRIPTION OF THE DRAWINGS

The invention is further elucidated below with reference to the appended schematic drawings, in which:

FIG. 1 shows an arrangement for the humidification of a cabin air of an aircraft according to a first embodiment;

FIG. 2 shows a second embodiment of an arrangement for the humidification of the cabin air of an aircraft;

FIG. 3 shows a variant of FIG. 2;

FIG. 4 shows a further embodiment of an arrangement for the humidification of the cabin air of an aircraft;

FIG. 5 shows yet another embodiment of an arrangement for the humidification of the cabin air of an aircraft, and FIG. 6 shows possible positions of outlet nozzles for a conditioning fluid in an aircraft cabin.

DETAILED DESCRIPTION

In the exemplary architecture for decentralised, individual cabin air humidification of a passenger or cargo aircraft shown in FIG. 1, an outlet nozzle from which a conditioning fluid conditioning the cabin air is ejected is designated by 10. Conditioning is understood here to mean at least humidification of the cabin air, additionally with influencing of the temperature of the cabin air if desired. An air supply line 12 leads to the outlet nozzle 10. The air supply line 12 carries an air flow which is blown from the outlet nozzle 10. In close spatial association with the outlet nozzle 10, water is sprayed by means of a schematically indicated spray element 14, the sprayed water being entrained by the air flow in the air supply line 12 and carried into the cabin. Close spatial association is understood here to mean that the water is sprayed close to or directly at the location of the outlet nozzle 10. The outlet nozzle 10 and the spraying element 14 may be constructionally unified. However, it is also possible to use separate components for this purpose. The water spraying point and the ejection point from which the conditioning fluid is ejected from the outlet nozzle 10 may be separated, for example, by a few millimeters or a few centimeters. A distance between the water spraying point and the ejection point of the conditioning fluid within the range of a few meters or above is not understood in the context of the invention to be close spatial association.

The water to be sprayed is supplied from a container 16 to the spray element 14 via a water line 18. The water container 16 may be a permanently installed container which can be filled from outside via a suitable filling interface, or it may be a removable container which is removed and filled as needed, for example, before a flight, or exchanged for another. It may be a pressure container in which the water is contained under pressure. However, it may also be an unpressurised container. In particular in the latter case, and also in situations in which the water line 18 is relatively long and/or thin, a feed pump, schematically indicated at 20 in FIG. 1, by means of which the water can be fed to the spray element 14, is advantageously inserted in the water line 18. A diaphragm pump, a piston pump or a turbo pump may be used, for example, as the feed pump 20.

The water line 18 is so designed that it satisfies the pressure conditions prevailing therein. In addition, it preferably meets relevant hygiene regulations. Suitable materials are, for example, plastics and metals. The water line 18 is preferably also resistant to disinfectants and cleaning agents, since, with the architecture according to FIG. 1, cleaning of the water system may be required from time to time. For cleaning, the container 16 may be filled with, for example, a suitable cleaning solution, or such a solution in a separate container may be connected to the water line 18. Depending on the type of cleaning solution used, the air flow in the air supply line 12 may be switched on or off during the cleaning procedure. It is possible to use ozonised water which is flushed through the air supply line 12 in combination with an air flow. With solutions containing chlorine it is recommended to switch off the air flow and to catch the solution with a collecting element, for example, a hose connected to the outlet nozzle 10. In particular for the case in which the distance between the container 16 and the spray element 14 or the outlet nozzle 10 is sufficiently short, it is possible that the water line 18 may be exchangeable together with the container 16.

To compensate for the vaporisation enthalpy of the sprayed water, so that the vaporisation of the sprayed water does not cause a local temperature drop in the cabin, the air flow in the air supply line 12 and/or the water conveyed in the water line 18 may be individually heatable. In the embodiment in FIG. 1 a first heating device 22 and a second heating device 24, associated for this purpose respectively with the water line 18 and the air supply line 12, are indicated schematically. The heating devices 22, 24 may be, for example, heat exchangers or electric heaters. They may have a fixed setting or may form part of a closed control loop by means of which the energy transfer to the water or to the air flow can be regulated. In such a case a temperature sensor (not shown in detail in FIG. 1), which detects the actual temperature of the air flow in the air supply line 12 or of the water in the water line 18 and supplies it to an electronic control unit controlling the heating device concerned, may be arranged downstream of the heating device concerned. This control unit may be a separate control unit which is used only to control the heating device concerned. It is also possible to use a central control unit which controls all the controllable components of the architecture shown in FIG. 1. Such a central control unit is indicated schematically at 26 in FIG. 1. The relevant control unit then determines a suitable correcting variable for the heating device concerned from the actual value of the water or air temperature supplied.

Although a corresponding heating device is provided for both components of the conditioning fluid in FIG. 1, it is self-evident that, instead, only the air flow in the air supply line 12 or only the water in the water line 18 may be heatable. In such a case a single heating device, associated either with the air supply line 12 or the water line 18, may suffice.

The air flow emerging from the outlet nozzle 10 may be, for example, of the order of magnitude of 2 to 20 l/s. The air velocity at the outlet nozzle 10 is preferably such that a value of less than 0.2 m/s is established on the face and body of the person towards whom the conditioning fluid is ejected. The quantity of water sprayed is preferably sufficient to maintain a relative air humidity of the order of magnitude of 20% to 60% in the face region of the person concerned.

The outlet nozzle 10 may be rigid, or may be orientable in different directions. To influence the volume flow of the conditioning fluid emerging from the outlet nozzle 10, the outlet cross-section of the outlet nozzle 10 may be adjustable, in particular closable. Alternatively or additionally, the volume flow of the air in the air supply line 12 may be capable of being influenced. In this case it is recommended that when the volume flow of air in the air supply line 12 is changed, at the same time the quantity of water sprayed is changed to a corresponding degree. For this purpose a mechanical coupling may be present between the actuators which determine the volume flow of air in the air supply line 12 and the quantity of water sprayed. Equally, it is possible that, to influence the quantity of water sprayed, the spray element 14 and/or the feed pump 20 is/are controllable, for example, by the central control unit 26. However, it is not ruled out that the outlet nozzle 10 is permanently open and the volume flow of the air is preset permanently and consequently is not variable.

The spray element 14 may inject the water into the air flow transversely or longitudinally thereto. It is also possible that the spray element ejects the water directly into the cabin, and its combination with the air flow occurs only there. The spray element 14 may be, for example, a piezo nozzle, an ultrasonic atomiser or a venturi element.

The energy for heating the air in the air supply line 12 and/or the water in the water line 18 may be made available, for example, electrically. It may also originate from the heat dissipated from various electrical, pneumatic or hydraulic devices of the aircraft. If water from a fuel cell is available in vapour form, this vapour may be used instead of the water stored in the container 16, and cooled by means of a heat exchanger. The energy released thereby may be discarded unused. However, it may be used to heat the air in the air supply line 12.

The water introduced into the air flow is preferably demineralised and microbiologically pure. Water containing minerals might lead to undesired calcium deposition in the cabin, while microbiologically contaminated water might induce illnesses. For this reason a treatment unit 28 in which the water supplied in the water line 18 is treated physically and/or chemically and/or biologically is provided in the air humidification arrangement of FIG. 1. The treatment unit 28 may, for example, carry out degerming of the water. If the water is mineral-free but not completely degermed, the treatment unit 28 may contain a device for destroying microorganisms. The degerming may also be performed physically, for example, by irradiating the water with ultraviolet light or by exposure to ultrasonic waves. These methods require only a small use of energy necessary to kill the germs.

Figure 1:
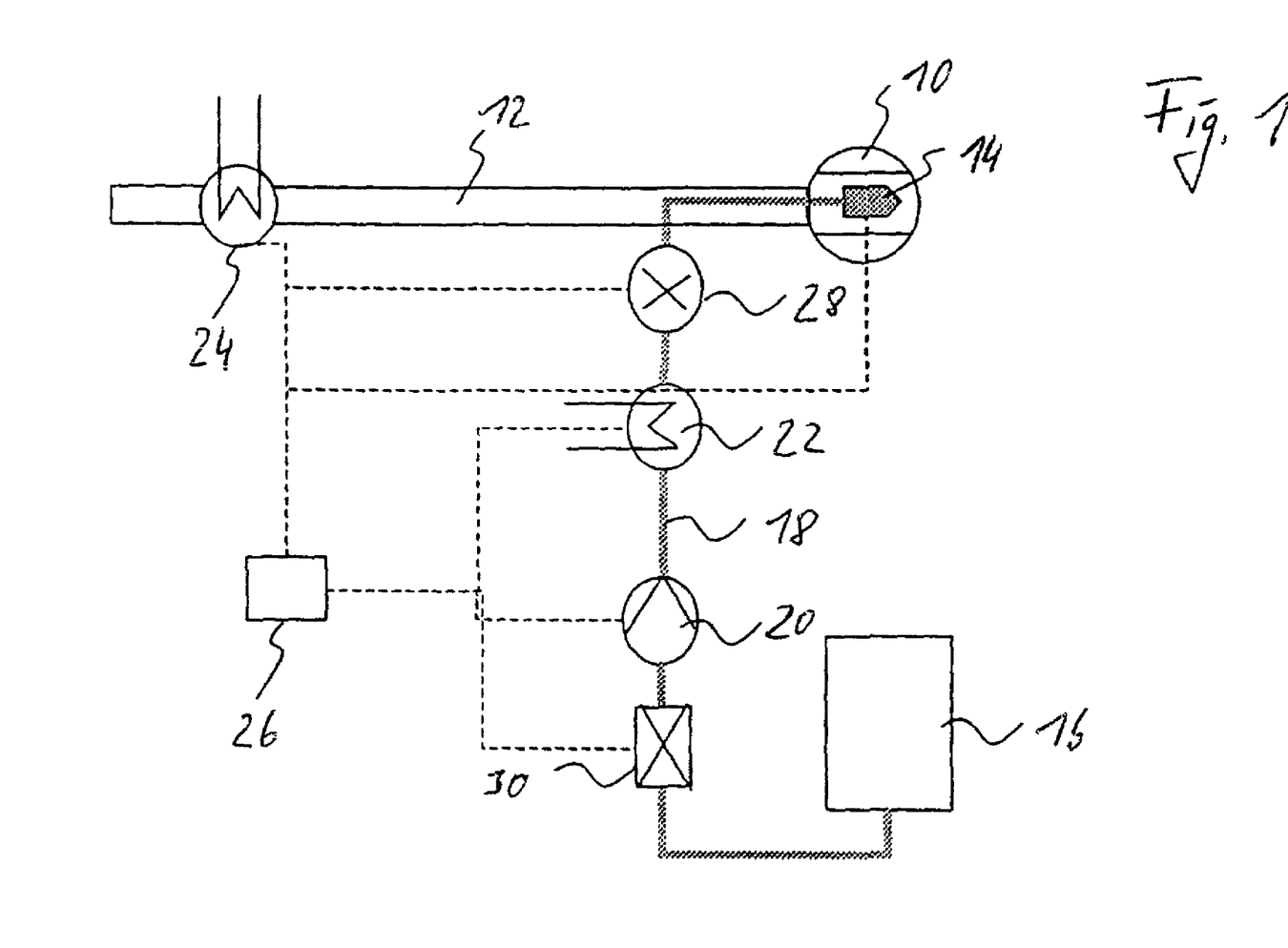

A valve 30 indicated schematically in FIG. 1 offers the possibility of interrupting the water supply to the spray element 14. The valve 30 may be operable manually. However, as indicated by a broken line in FIG. 1, it may be controllable by the control unit 26.

In the other Figures identical components or components having the same effect as in FIG. 1 are provided with the same reference numerals, suffixed with lowercase letters. To avoid repetitions, reference is made to the preceding discussion of FIG. 1. Unless stated otherwise below, this discussion applies analogously to the components shown in the further Figures.

Figure 2:
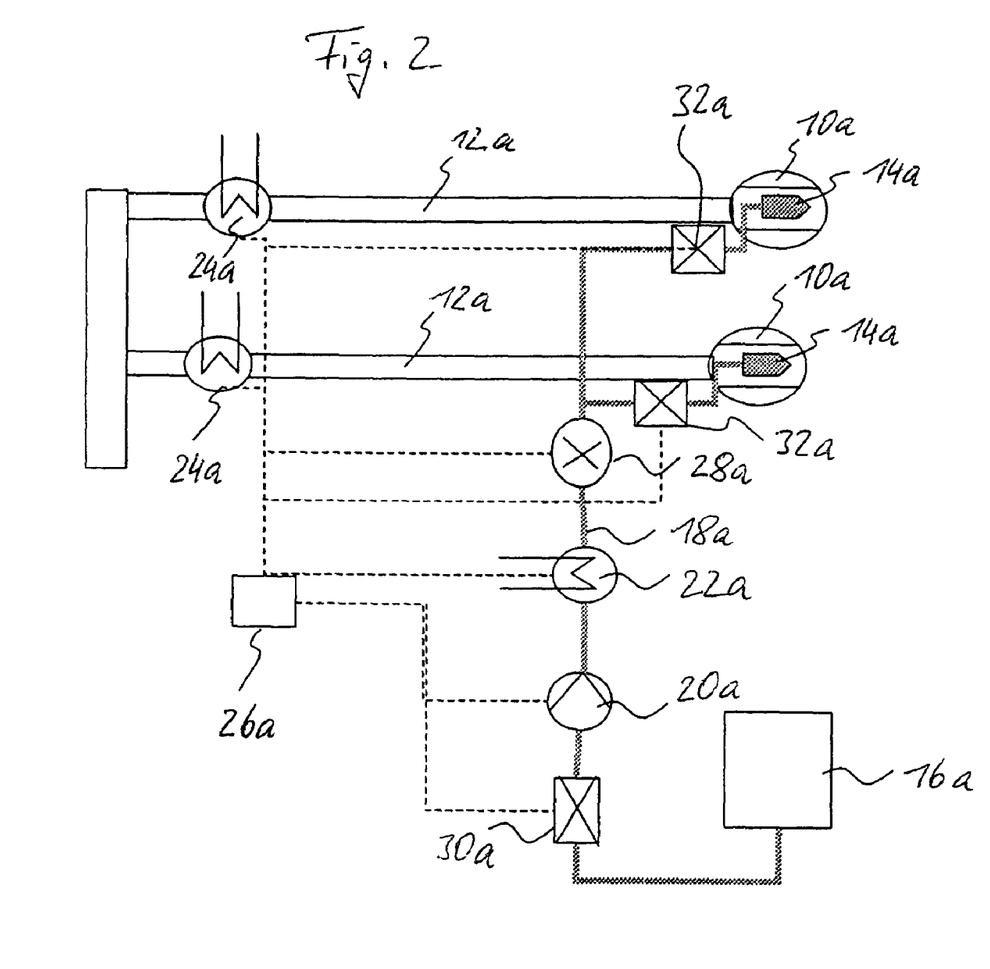

The embodiment in FIG. 2 relates to a system in which a plurality (two in the example shown) of outlet nozzles 10a are supplied centrally with water and air. It is conceivable that some tens, some hundreds or even a thousand or more outlet nozzles 10a could be fed from a common water and air supply. To be able to influence the water supply to the outlet nozzles 10a or the spray elements 14a individually, each outlet nozzle 10a may have associated with it a separate shut-off valve 32a which is inserted in the relevant line branch leading from the central water line 18a to the spray element 14a concerned. The shut-off valves 32a may be controllable by the control unit 26a. It is also conceivable to give the passengers the possibility to control the shut-off valves 32a via suitable operating elements. If the shut-off valves 32a are present, moreover, the main valve 30a in the water line 18a can be omitted.

The control unit 26a may be configured to control the ejection of conditioning fluid from the outlet nozzles 10a individually for each outlet nozzle 10a, or in groups of a plurality of outlet nozzles 10a in each case. It is also possible that a plurality of control units independent of one another are provided, each of which is responsible for controlling only a partial number of outlet nozzles. Thus it is possible, for example, to provide one control unit per temperature zone of the aircraft cabin.

Figure 3:
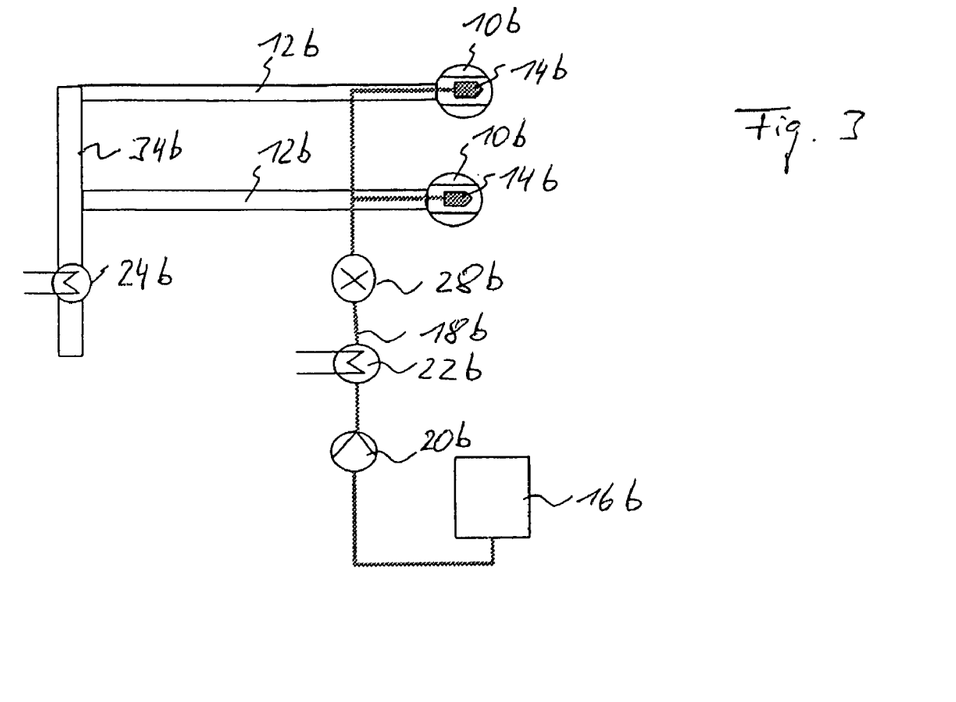

In the variant shown in FIG. 3, unlike the embodiment in FIG. 2 in which the air in the air supply lines 12a is heatable individually by means of a heating device 24a, the air supply for a plurality (two in the example illustrated) of air outlets 10b is heated centrally. For this purpose there is provided a heating arrangement 24b associated with a feed line 34b from which the individual air supply lines 12b branch off. The energy for heating the air may come from the same sources as previously mentioned in connection with FIG. 1. Hot air tapped from the engines may also be considered as a further source. Air tapped from the engines may, after pressure regulation, be blown directly into the air flow supplied in the feed line 34b, in order to control the temperature of this air flow. It is equally possible to transfer the heat energy of the air tapped from the engines via a heat exchanger to the air flow in the feed line 34b. A tube-bundle or plate heat exchanger may be suitable for this purpose. For reasons of clarity neither a main valve nor the shut-off valves associated with the individual spray elements 14b are shown in FIG. 3. It is self-evident that such valves may be provided, as for the embodiment of FIG. 2 or the variant of FIG. 3.

The conditioning fluid ejected into the aircraft cabin may also consist only of sprayed water. In such a configuration an additional air flow which entrains the sprayed water is dispensed with. The water must be then heated to a temperature above the cabin temperature in order not to impair the thermal comfort in the cabin.

Figure 4:
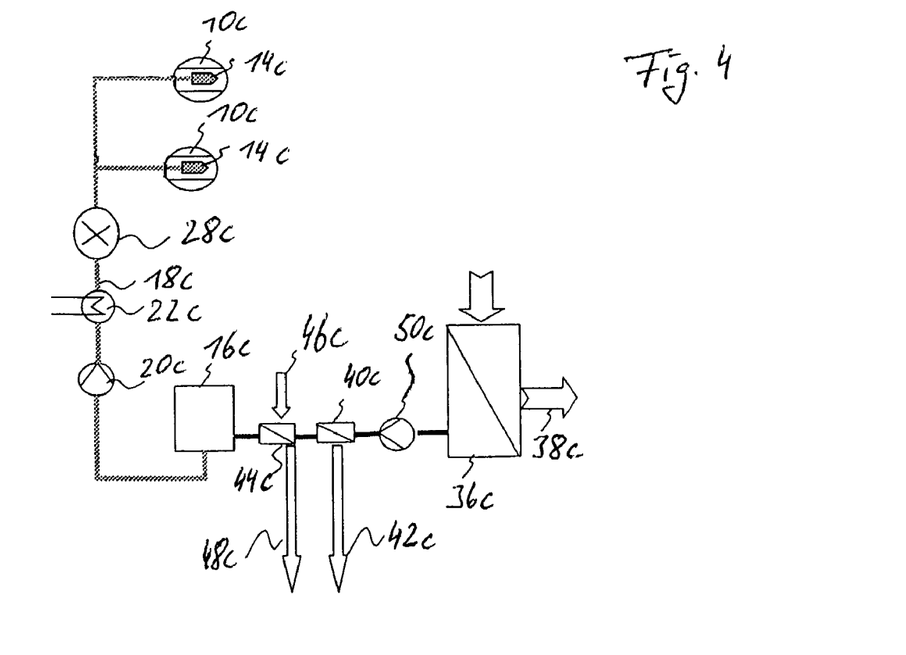

An embodiment without additional air flow is shown in FIG. 4. The water contained in the container 16c may be made available in different ways. For example, the water may be obtained through precipitation from the cabin air and reused for humidification of the cabin. However, before the water obtained in this way is sprayed once more, careful treatment is required. Water may be precipitated from the cabin air by adsorption or supersaturation. In FIG. 4 an interceptor is illustrated schematically at 36c. The dried outgoing air 38c may either be discharged from the aircraft or directed into the cabin as supply air after prior treatment. It may also be used for drying and/or heating structural parts of the aircraft on which humidified cabin air can condense.

In the exemplary case illustrated at 40c in FIG. 4, the liquid water made available by the interceptor 36c is subjected to a first stage of water treatment. In this treatment stage particles and/or phases (solid-liquid or liquid-liquid) are separated. To separate particles a water filter with a separating power of from 50 to 200 μm may, for example, be used. In preparation stage 40c separation may also be performed according to density of phases. A centrifugal separator, for example, may be used here. In the context of the treatment stage 40c a waste mass flow 42c may be produced, that is continuously removed.

In a concluding second stage of water treatment, performed at 44c in FIG. 4, separation of dissolved components and/or microbiological contaminants is carried out. This separation may be effected according to chemical potential or particle size. Possible separation methods are membrane techniques such as microfiltration, ultrafiltration, nanofiltration, reverse osmosis and electrodialysis, or physical/chemical techniques such as adsorption, absorption, precipitation and electrophoresis. If adsorption, absorption or precipitation apparatus is used, a material flow 46c must be fed to the apparatus and a material flow 48c charged with the components to be separated must be discharged from the apparatus. Separation of different phases may be performed in treatment stage 44c, for example, according to particle size and/or settling speed in a centrifugal field.

If the geostatic gradient is not sufficient to cause the water made available by the interceptor 36c to flow through the treatment stages 40c, 44c to the container 16c, a feed pump 50c may be provided to convey the liquid water of the interceptor 36c. This feed pump 50c may be, for example, a piston, diaphragm or turbo pump.

Again for reasons of clarity, neither a control unit nor valves to shut off the water flow in the water line 18c are shown in FIG. 4. However, it is self-evident that such components may also be present in the embodiment of FIG. 4, as is the case in the embodiments in FIGS. 1 and 2. It is also self-evident that the type of water acquisition and treatment shown in FIG. 4 may be used in the other embodiments considered here.

Figure 5:
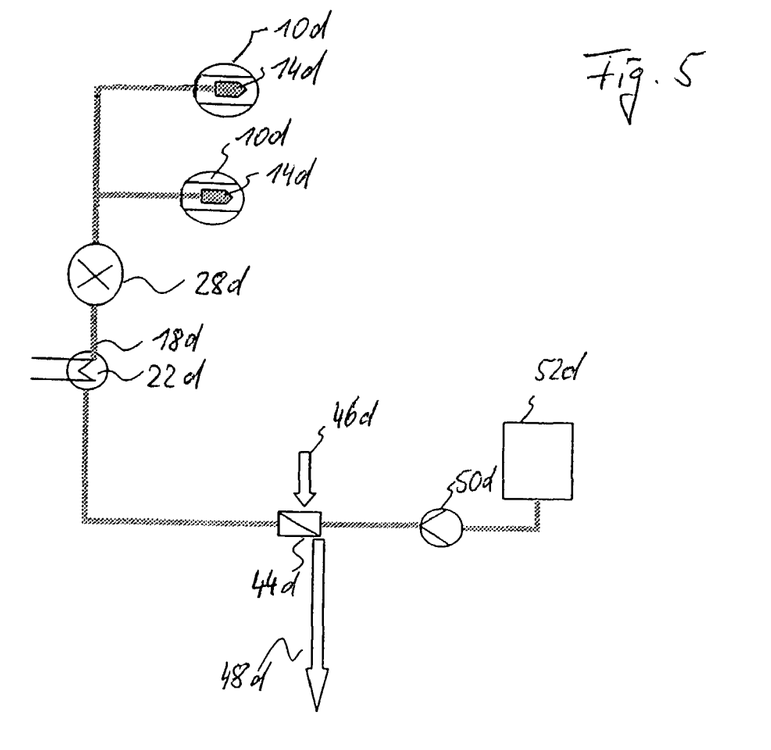

The embodiment of FIG. 5 shows a system architecture in which drinking water from an onboard freshwater tank 52c is treated in such a way that it can be used for individual humidification. Regarding water treatment techniques, reference is made to the discussion in connection with the description of FIG. 4.

Figure 6:
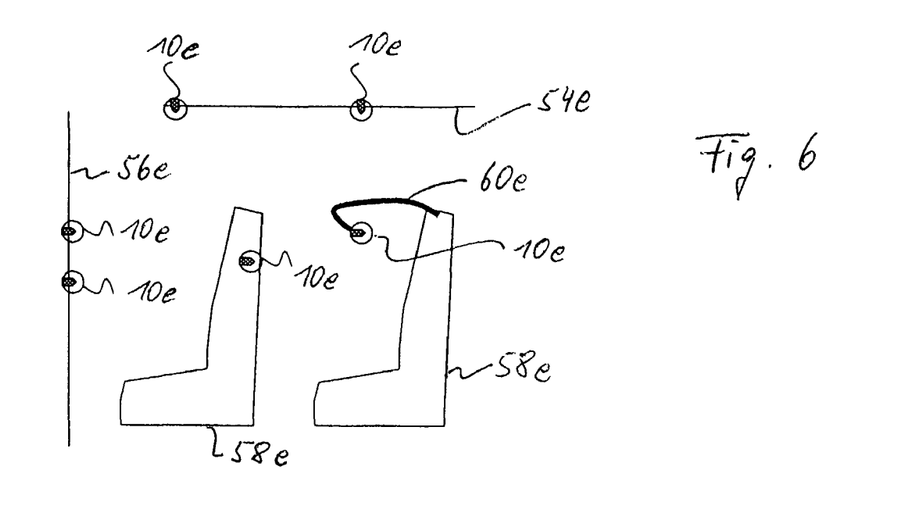

Finally, FIG. 6 shows various possible positions in which outlet nozzles 10e may be installed in an aircraft for the purpose of individual air humidification. One possibility is the ceiling trim panel of the aircraft cabin, designated 54*e* in FIG. 6. Another possibility consists in installing outlet nozzles 10*e* in a front or side wall trim panel 56*e* of the cabin. In addition, the rear side of the backrest of a passenger seat 58*e* may be used for installing an outlet nozzle 10*e*, which the passenger sitting behind it can use for individual air humidification. An outlet nozzle 10*e* may also be fitted to an end of a stiff but flexible hose 60*e*, the other end of which is fixed, for example, to the headrest area of a seat 58*e*. The hose 60*e* enables adaptation to different sizes of passenger and adaptation to different seat positions, so that, for example, precise humidification of the face area of the person in the seat is also possible in a reclining position. The more precisely the conditioning fluid emerging from the outlet nozzles 10*e* is directed on to the faces of the passengers, the more effectively the water is used, which is favourable for low overall water consumption.

The invention claimed is:

1. Apparatus for the humidification of the air in a cabin of a passenger or cargo aircraft, comprising:

an outlet nozzle (10) configured to deliver a conditioning fluid into the cabin, the conditioning fluid including water sprayed at a spraying point in close spatial association with the outlet nozzle (10) and an air flow for carrying the sprayed water;

a first heating device (22) for heating the water to be sprayed at the spraying point;

a second heating device (24) for heating the air flow, the second heating device being completely independent from the first heating device; and a central control unit (26) operatively connected to the first heating device (22) and the second heating device (24) and adapted to control an injection temperature of at least one of (a) the water supplied to the spraying point from the first heating device (22), and (b) the air flow from the second heating device (24), so as to assure that the conditioning fluid emerging from the outlet nozzle (10) flows into the cabin at a desired effective temperature after evaporation of the water.

2. Apparatus according to claim 1, wherein the central control unit (26) controls the second heating device (24) such that the injection temperature of the air flow supplied to the spraying point is above the desired effective temperature by 5 to 40 degrees Celsius.

3. Apparatus according to claim 1, wherein the central control unit (26) controls the first heating device (22) such that the injection temperature of the water sprayed at the spraying point is greater than the cabin temperature.

4. Apparatus according to claim 1, wherein the central control unit (26) controls the second heating device (24) such that the injection temperature of the air flow supplied to the spraying point is greater than the cabin temperature.

5. Apparatus according to claim 1, wherein the central control unit (26) controls the second heating device (24) such that the injection temperature of the air flow supplied to the spraying point is less than the cabin temperature.

6. Apparatus for the humidification of the air in a cabin of a passenger or cargo aircraft, comprising:

an outlet nozzle (10) configured to deliver a conditioning fluid into the cabin, the conditioning fluid including only water sprayed at a spraying point in close spatial association with the outlet nozzle (10);

a first heating device (22) for heating the water to be sprayed at the spraying point; and a central control unit (26) operatively connected to the first heating device (22), and controlling an injection temperature of the water supplied to the spaying point from the first heating device (22) so as to assure that the conditioning fluid emerging from the outlet nozzle (10) flows into the cabin at a desired effective temperature after evaporation of the water.

7. Apparatus according to claim 6, wherein the central control unit (26) controls the first heating device (22) such that the injection temperature of the water sprayed at the spraying point is greater than the cabin temperature.

8. Apparatus according to claim 6, further comprising:

a treatment unit (28) for the biological, chemical, or physical treatment of the water to be sprayed.

9. Apparatus according to claim 6, further comprising:

a flexible hose (60*e*) projecting into the cabin interior, the flexible hose (60*e*) having one end thereof connected to a headrest area of a seat (58*e*) and an opposite end thereof connected to the outlet nozzle (10*e*).

10. Apparatus according to claim 1, further comprising:

a treatment unit (28) for the biological, chemical, or physical treatment of the water to be sprayed.

11. Apparatus according to claim 1, further comprising:

a flexible hose (60*e*) projecting into the cabin interior, the flexible hose (60*e*) connected at one end to a headrest area of a seat (58*e*) and at an opposite end to the outlet nozzle (10*e*).

12. A method for humidifying the air in a cabin of a passenger or cargo aircraft comprising:
   delivering water from a first heating device to a spraying point in close spatial association with an outlet nozzle that is directed into the cabin of the aircraft, the aircraft further including a second heating device and a central control unit operatively connected to the first and second heating devices;
   delivering air from the second heating device to the spraying point;
   spraying the water into the air to create a conditioning fluid;
   expelling the conditioning fluid from the outlet nozzle into the cabin; and
   controlling at least one of the first and second heating devices with the central control unit such that an injection temperature of at least one of (a) the water from the first heating device, and (b) the air from the second heating device is high enough to assure that the conditioning fluid will flow into the cabin at a desired effective temperature after evaporation of the water.

* * * * *